United States Patent [19]
Chen et al.

[11] Patent Number: 5,606,478
[45] Date of Patent: Feb. 25, 1997

[54] NI$_{45}$FE$_{55}$ METAL-IN-GAP THIN FILM MAGNETIC HEAD

[75] Inventors: Mao-Min Chen, San Jose; Neil L. Robertson, Campbell, both of Calif.

[73] Assignee: International Business Machines Corporation, Armonk, N.Y.

[21] Appl. No.: 351,996

[22] Filed: Dec. 8, 1994

[51] Int. Cl.$^6$ .................... G11B 5/39; G11B 5/193
[52] U.S. Cl. ............................. 360/126; 360/113
[53] Field of Search ..................... 360/119, 120, 360/125, 126, 113; 29/603

[56] References Cited

U.S. PATENT DOCUMENTS

| | | | |
|---|---|---|---|
| 4,589,042 | 5/1986 | Anderson et al. | 360/125 |
| 4,646,184 | 2/1987 | Goto et al. | 360/110 |
| 5,012,375 | 4/1991 | Nishimura | 360/119 |
| 5,157,570 | 10/1992 | Shukovsky et al. | 360/126 |
| 5,173,822 | 12/1992 | Kuriyama et al. | 360/120 |
| 5,184,266 | 2/1993 | Kanai et al. | 360/120 |
| 5,224,002 | 6/1993 | Nakashima et al. | 360/126 |
| 5,239,435 | 8/1993 | Jeffers et al. | 360/126 |
| 5,311,387 | 5/1994 | Mallary | 360/126 |
| 5,379,172 | 1/1995 | Liao | 360/126 |
| 5,382,305 | 1/1995 | Terunuma et al. | 148/306 |
| 5,435,053 | 7/1995 | Krombi et al. | 29/603 |
| 5,438,747 | 8/1995 | Krombi et al. | 29/603 |
| 5,452,164 | 9/1995 | Cole et al. | 360/113 |

FOREIGN PATENT DOCUMENTS

| | | | |
|---|---|---|---|
| 57-24015 | 2/1982 | Japan | 360/126 |

OTHER PUBLICATIONS

R. Chestnutt et al., "Reduced Temperature Electroplating of NiFe Alloys," IBM Technical Disclosure Bulletin, vol. 29, No. 5, Oct. 1986, p. 1910.

*Primary Examiner*—Robert S. Tupper
*Assistant Examiner*—Paul J. Ditmyer
*Attorney, Agent, or Firm*—Baker, Maxham, Jester & Meador

[57] ABSTRACT

The present invention provides a novel high magnetic moment material for the pole pieces as well as a metal-in-gap configuration for the pole tips of either an inductive magnetic head only or the inductive portion of a MR head. The novel material is Ni$_{45}$Fe$_{55}$. In the MIG configuration each pole piece of the inductive head or the inductive head portion of a MR head has a combination of layers, each combination of layers including a first layer of high magnetic moment material Ni$_{45}$Fe$_{55}$ adjacent to a transducing gap and a second layer of low magnetic moment material such as Permalloy (Ni$_{81}$Fe$_{19}$) further away from the gap. Since both layers are made of NiFe all the desirable properties of this type of material can be employed as well as simplifying its construction with similar plating baths. The saturation of the first layers is 50 to 60 percent higher than the saturation of the second layers. The present invention avoids effects of magnetostriction in spite of the high magnetic moment of the first layers. By appropriately selecting the thickness ratio of the second layer with respect to the first layer the magnetostriction of the laminated structure can be reduced substantially to zero. When this thickness ratio is in the order of five to nine the magnetostriction is reduced to, or slightly below, zero. If the inductive head is employed for write functions only then the second pole tip or both pole tips can be constructed of the high moment Ni$_{45}$Fe$_{55}$ material without any thickness ratio or MIG configuration constraints.

30 Claims, 7 Drawing Sheets

FIG. 8 (ABS VIEW)

$Ni_{45}Fe_{55}$ METAL-IN-GAP THIN FILM MAGNETIC HEAD

BACKGROUND OF THE INVENTION

1. Field of the Invention

The present invention relates to a thin film magnetic head and more particularly to a thin film magnetic head which employs high moment NiFe alloys for the magnetic poles in an inductive write element.

2. Description of the Related Art

Two major types of thin film magnetic heads are the inductive head and the inductive/magnetoresistive (MR) head. Both of these heads can write and read signals with respect to a magnetic medium. The inductive head includes first and second poles which have first and second pole tips respectively. The pole tips are separated by a gap at an air bearing surface (ABS) or head surface. A coil is positioned between the first and second poles. The MR head has an inductive write head portion and an MR read head portion. The read head portion includes an MR stripe which is sandwiched between a pair of gap layers, the gap layers in turn being sandwiched between first and second shield layers. In the MR head the inductive head portion performs write functions and the MR read head portion performs read functions. Either type of magnetic head is mounted on or embedded in a slider which is supported in a transducing relationship with respect to a magnetic medium. The magnetic medium can be either a magnetic disk or a magnetic tape.

Considerable research has been undertaken to increase the recording density of magnetic heads. The length (i.e., the thickness) of the gap between the first and second pole tips has been significantly decreased so that more bits per inch can be written. Further, the coercivity of the magnetic medium has been increased to allow the medium to retain a higher bit density. A consequence of a higher bit density is a higher data rate for information as it is made or written on the medium.

These improvements require the material of the magnetic poles to conduct relatively high flux densities, especially those portions of the poles, i.e., the pole tips, which are adjacent to the gap. However, materials have a saturation level beyond which they will conduct no more flux. Accordingly, there is a need for a pole tip structure which has a high saturation moment ($4\pi M_s$), hereinafter referred to as "the moment" of the material.

The first and second pole pieces, including the pole tips, are typically constructed of Permalloy ($Ni_{81}Fe_{19}$). Permalloy is a desirable material for pole construction, having good soft magnetic properties and being easy to shape by normal patterning and deposition techniques. Further, Permalloy has good corrosion resistance for head reliability. Permalloy has a moment which is approximately ten kilogauss (10 kG). It would be desirable if this moment could be increased so that the pole tips could carry a larger flux density without saturation. It is also useful if the material's magnetic and electrical properties change so that eddy currents do not interfere with high frequency operation. Eddy current damping is improved by increasing the resistivity of the material as well as decreasing the permeability.

Cobalt based magnetic alloys have an increased moment with respect to Permalloy. However, these materials have significantly worse corrosion resistance. Another family of materials are sputtered FeNX, where X is from the group of Ta, Al, and Rh. This is not as desirable as frame plating the pole pieces since ion-milling is required after the sputtering to shape the trackwidth of the pole tips. This process is very difficult to implement. Furthermore, sputtered materials exhibit a high stress which can cause distortion in recorded signals.

U.S. Pat. No. 4,589,042, assigned to the instant assignee, discloses an inductive read/write head wherein the pole tip regions of the magnetic poles are fabricated of a high moment material while the remainder of the pole structure is of Permalloy. The pole tip regions are made of high moment $Ni_{45}Fe_{55}$ and extend to a position short of the first coil winding beyond the point of initial saturation of the poles with the balance of the poles being of high permeability material such as Permalloy. However, as discussed below with respect to a MIG head, the $Ni_{45}Fe_{55}$ has a high positive magnetostriction which adversely impacts the read signal.

Another method of increasing the flux density at which the pole-tips saturate is to employ a metal-in-gap (MIG) configuration of the pole-tips. The prior art teaches constructing one or more of the pole tips with a bilayer configuration, one of the layers having a high moment and other layer a lower moment. The higher moment material is placed adjacent the gap where it is most needed. However, a high moment material may exhibit poor performance if the magnetostriction of the material is not controlled. Magnetostriction significantly affects the domain structure of the material causing the domains to be switched in intervals which leads to poor performance. This is manifested in the inductive magnetic head when it is also employed for reading. In a merged MR head, where the second shield of a MR read head serves also as a first pole of an inductive write head portion, the reading performance is poor if the magnetostriction of the first pole/shield is not controlled.

The desired magnetostriction for pole tip material is zero or slightly negative. It would be desirable if the pole tips could be constructed with a MIG configuration having a high moment and near zero magnetostriction or in a pole design that improves write performance without impacting readback.

SUMMARY OF THE INVENTION

We have discovered methods of improving the write performance of heads at high density and high data rates. The best material is high Fe NiFe with Fe in the range 50–60% which will be referred to herein as $Ni_{45}Fe_{55}$ or 45/55. This material has a magnetic moment in the range of 15–17 kG with a high resistivity and lower permeability than Permalloy. The rest of the magnetic properties are excellent. However, as noted above, the material does exhibit high magnetostriction. This material can be used in several configurations to improve write performance without impacting read back, as long as the magnetostriction of the material is modified or it is used with care in the head design.

We have discovered that by selecting appropriate thicknesses of high moment and low moment NiFe in a MIG configuration that the magnetostriction can be reduced to substantially zero. When a thickness ratio of the layers (thickness of the higher moment layer divided by the thickness of the lower moment layer) is in a range of 5 to 9, magnetostriction is significantly minimized. In a pole structure wherein $Ni_{45}Fe_{55}$ is employed for the high moment layer adjacent the gap and Permalloy is employed for the second layer further from the gap, a thickness ratio of 7 provides the combined layered pole structure with a magnetostriction of substantially zero. The use of $Ni_{45}Fe_{55}$ is described in several different preferred embodiments wherein the entire magnetic pole structure comprises a layer of high moment material and a layer of low moment material or various other head designs having improved high density and high frequency performance.

1. A merged MR head with $Ni_{45}F_{55}$ for both PT1 and PT2. (FIG. 11).
2. A merged MR head with PT2 $Ni_{45}Fe_{55}$ and PT1 of Permalloy so that the read head is shielded from any potential noise (FIG. 12).
3. A piggy-back style MR head with a $Ni_{45}Fe_{55}$ PT1 and PT2 and with the separate S2 of Permalloy to shield the read head from any potential noise (FIG. 14).
4. A merged MR head with a pure $Ni_{45}Fe_{55}$ PT2 and a MIG style PT1 (FIG. 15).
5. A MIG style inductive head for both PT1 and PT2 for a merged MR head (FIG. 13).
6. A MIG style inductive only head for both PT1 and PT2 with improved writing performance and no read back degradation (FIG. 13).

An object of the present invention is to provide a non-saturating magnetic head which has high resolution recording with no impact on read back.

Another object is to provide a non-saturating inductive write element wherein the magnetostriction of the pole-tips of the write head portion of the MR head does not affect the performance of the read head portion of the MR head.

A further object is to provide a non-saturating magnetic head with near zero magnetostriction.

Still another object of the present invention is to provide a non-saturating magnetic head which has high resolution recording and reading performances.

Still a further object is to provide a non-saturating magnetic head with near zero magnetostriction.

Still another object is to provide a non-saturating inductive write element wherein the magnetostriction of the pole tips of the write head portion of the MR head does not affect the performance of the read head portion of the MR head.

Still a further object is to provide a metal-in-gap configured pole tip for a magnetic head which has a high moment layer adjacent a gap and a lower moment layer further from the gap, the combination of the high and low moment layers having a magnetostriction which is substantially zero.

Still another object of the invention is to provide a metal-in-gap configured pole tip which has combined high and low moment NiFe layers of substantially zero magnetostriction and which can be plated with a single plating bath.

The foregoing, together with other objects, features and advantages of this invention, will become more apparent when referring to the following specification, claims and accompanying drawing.

DESCRIPTION OF THE PREFERRED EMBODIMENTS

Figure 1:
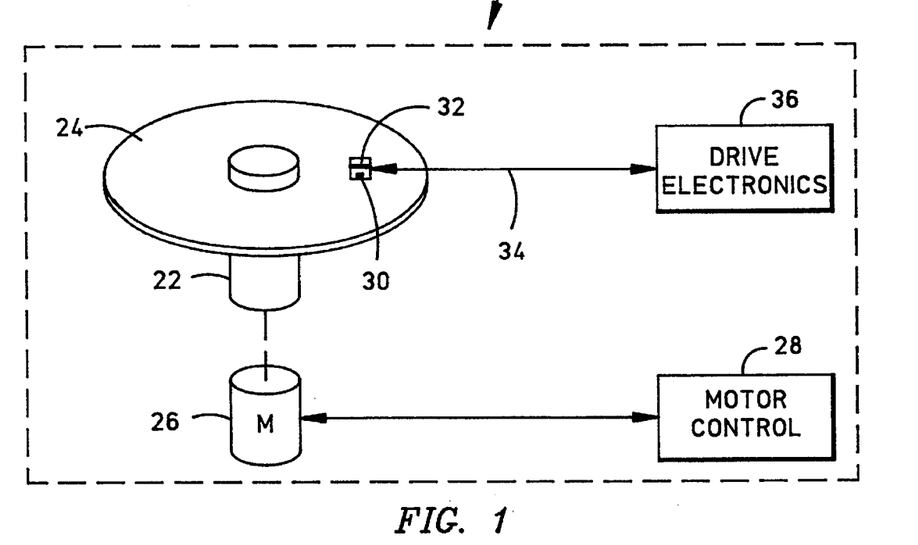
FIG. 1 is a schematic illustration of a magnetic disk drive which employs the magnetic head of the present invention.

Referring now to the drawings wherein like reference numerals designate like or similar parts throughout the several views there is illustrated in FIG. 1 a magnetic disk drive 20. The drive 20 includes a spindle 22 which supports and rotates a magnetic disk 24. The spindle 22 is rotated by a motor 26 which is controlled by motor controls 28. A magnetic head 30, which may be a merged MR head for recording and reading, is mounted on a slider 32 which in turn is supported by a suspension and actuator arm 34. The suspension and actuator arm 34 positions the slider 32 so that the magnetic head 30 is in a transducing relationship with a surface of the magnetic disk 34. When the disk 24 is rotated by the motor 26 air moved by the surface of the disk supports the slider on a cushion of air ("an air bearing") against the surface of the disk, in the order of 0.075 microns. The magnetic head 30 is then employed for recording information in multiple circular tracks on the surface of the disk 24 as well as for reading information therefrom. These information signals and servo signals for moving the slider to various tracks on the disk are processed by drive electronics 36.

Figure 2:
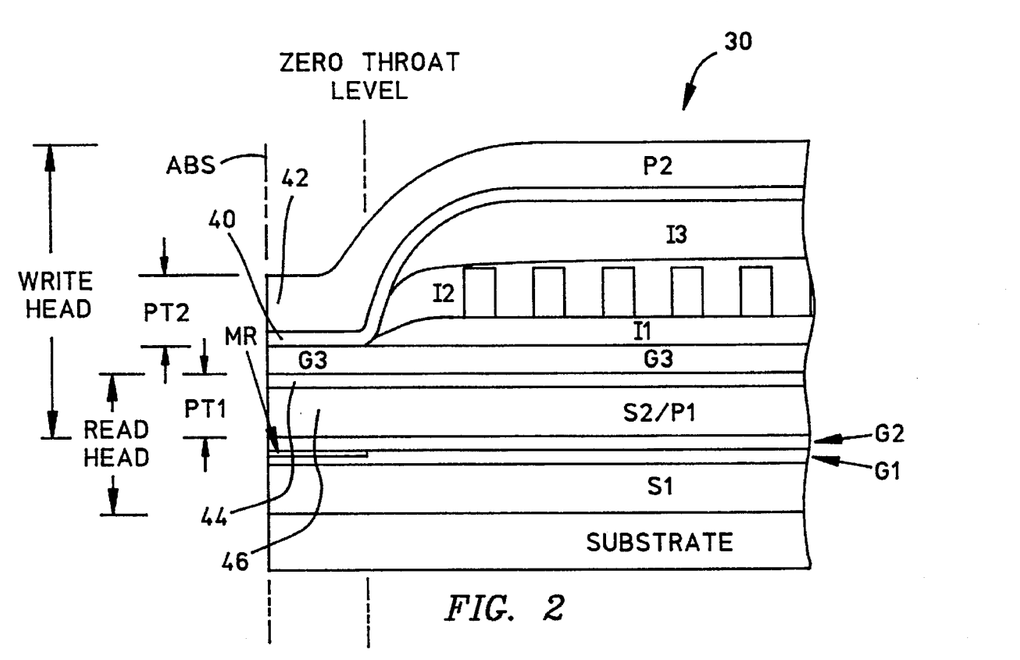
FIG. 2 is a side cross-sectional view of a merged MR head.

FIG. 2 is a side cross sectional schematic illustration of a merged MR head 30. In the fabrication of this head thin film layers are deposited to form the MR head portion after which additional thin film layers are deposited to form the write head portion. The first layer formed is the first shield layer S1 which is deposited on a substrate. A first gap layer G1 is then formed on top of the first shield layer S1 and an MR stripe MR is deposited on top of the first gap layer G1. A second gap layer G2 is deposited on top of the MR stripe and the first gap layer G1 after which a second shield layer S2 is deposited on top of the second gap layer G2. In a merged MR head the second shield layer S2 also serves as the first pole piece P1 for the write head. In a piggyback MR head (not shown) these are separate layers separated by an insulation layer. The gap layer G3 is formed on top of the second shield first pole piece layer S2/P1. A first insulation layer I1 is then formed on top of the gap layer G3 which terminates at a zero throat level. A conductive coil layer 38 is deposited on top of the first insulation layer I1 followed by a second insulation layer I2 which is formed on top of the first insulation layer I1. One or more additional insulation layers (I3) are then formed on top of the second insulation layer I2, both insulation layers I2 and I3 terminating near the zero throat level. As shown in FIG. 2, while the term "pole tip" specifically refers to that portion of the magnetic pole which, in combination with the gap layer, forms the transducing gap at the ABS of the head, for the purposes of the description of the present invention with reference to FIG. 2 and the succeeding figures, the described structure and materials for the pole tips PT1 and PT2 also applies to the entire magnetic pole P1 and P2, respectively, structure and materials.

The write head portion of the merged MR head in FIG. 2 is constructed with a metal-in-gap (MIG) pole tip configuration. Each of the magnetic poles P1 and P2, including the pole tips PT1 and PT2, comprise combined layers, the combined layers including a first layer of high saturation moment magnetic material and a second layer of low saturation moment magnetic material. As shown in FIG. 2, the pole PT2 has a first layer 40 of high saturation moment magnetic material and a second layer 42 of low saturation moment magnetic material, the first layer 40 being adjacent the gap G3 while the second layer 42 is spaced from the gap G3. The pole tip PT1 has a first layer 44 of high saturation moment magnetic material and a second layer 46 of low saturation moment magnetic material, the first layer 44 being closer to the gap G3 than the second layer 46. The high moment first layers 40 and 44 are considered to be adjacent to the gap layer G3. However, in practice, the first layer 40 is normally adjacent to a seed layer (not shown) which in turn is adjacent to the gap layer G3. By providing high moment first layers 40 and 44 adjacent the gap layer G3 a higher flux density can be transmitted through the pole tips PT1 and PT2 without saturation so that high density recording of a magnetic medium, such as the magnetic disk 24 in FIG. 1 can be implemented. With the MIG configuration, the high moment material is placed adjacent the gap layer where most of the transfer of flux between the pole tips takes place. Since the second pole tip PT2 is the last pole tip to induce flux into the magnetic medium it may be desirable in some instances to employ the MIG configuration for only the second pole tip.

In the preferred embodiment of the present invention the first and second layers of both pole tips PT1 and PT2 are constructed of NiFe. The preferred material for the second layers 42 and 46 of the pole tips PT2 and PT1 is Permalloy which is $Ni_{81}Fe_{19}$. This provides a moment of approximately 10 kG. The preferred material for the first layers 40 and 44 of the pole tips PT2 and PT1 is $Ni_{46}$ and $Fe_{54}$ which is substantially $Ni_{45}Fe_{55}$. The moment of this material is approximately 15 kG to 17 kG which is significantly larger than the moment of the second layers 42 and 46. Accordingly, the first layers 40 and 44 are referred to as high moment layers and the second layers 42 and 46 are referred to as low moment layers.

A problem with the $Ni_{45}Fe_{55}$ material of the high moment first layers 40 and 44 is its high magnetostriction. Magnetostriction is a measure of the magnetic response of the material to tensile or compressive stress forces which are quantified as plus or minus magnetostriction units respectively. These forces develop during the fabrication of the head. When the high moment layers 40 and 44 are constructed by plating, tensile forces are inherently set up in these layers destroying a desired uniform domain configuration. When flux is received by these high moment layers 40 and 44 in an inductive head only, it is transmitted in spurts within the pole tips causing the head to have poor reading performance. If the second shield S2 of a merged MR head has a high moment layer the noise from these spurts will interfere with the reading performance of the MR stripe.

The following chart entitled "Magnetic Property Summary" shows various important properties for the high moment first layers and the low moment second layers of a pole tip which are broadly categorized as $Ni_{45}Fe_{55}$ and $Ni_{80}Fe_{20}$ respectively and sometimes referred to hereinafter as 45/55 and 80/20

| | Magnetic Property Summary | |
|---|---|---|
| | 45/55 | 80/20 |
| % Fe | 54.4 | 16.3 |
| Ms (kG) | 15.5 | 9.6 |
| Hc | 0.45 | 0.35 |
| Hk | 7.5 | 2.3 |
| λ | $+38 \times 10^{-6}$ | $-4 \times 10^{-6}$ |

The actual proportion of iron of the 45/55 material was 54.4% and the actual percentage of iron of the 80/20 material was 16.3% in an experiment that provided the above values. The moment of the 45/55 material was 15.5 kG and the moment for the 80/20 material was 9.6 kG. The coercivity $H_c$ of the 45/55 material was 0.45 and the coercivity for the 80/20 material was 0.35 Oe. Coercivity can readily be determined from the B/H curve for the respective materials. Coercivity $H_c$ is the amount of applied field in Oersteds required to bring the flux density B of the material along its easy axis from remanent magnetization, either plus or minus, back to zero. $H_k$ is similar to $H_c$ except the values for $H_k$ are taken from a B/H curve along the hard axis of the respective materials and is the amount of applied field $H_k$ required to bring the material from saturation magnetization back to zero. $H_k$ for the 45/55 material was 7.5 Oe and the $H_k$ for the 80/20 material was 2.3 Oe. The magnetostriction of the 45/55 material was $+38\times10^{-6}$ and the magnetostriction of the 80/20 material was $-4\times10^{-6}$. It is desirable that the magnetostriction of the pole tips PT1 and PT2, especially adjacent the gap G3, be zero or slightly negative so that the aforementioned problems due to magnetostriction are not present to affect recording and reading performances.

Figure 3:
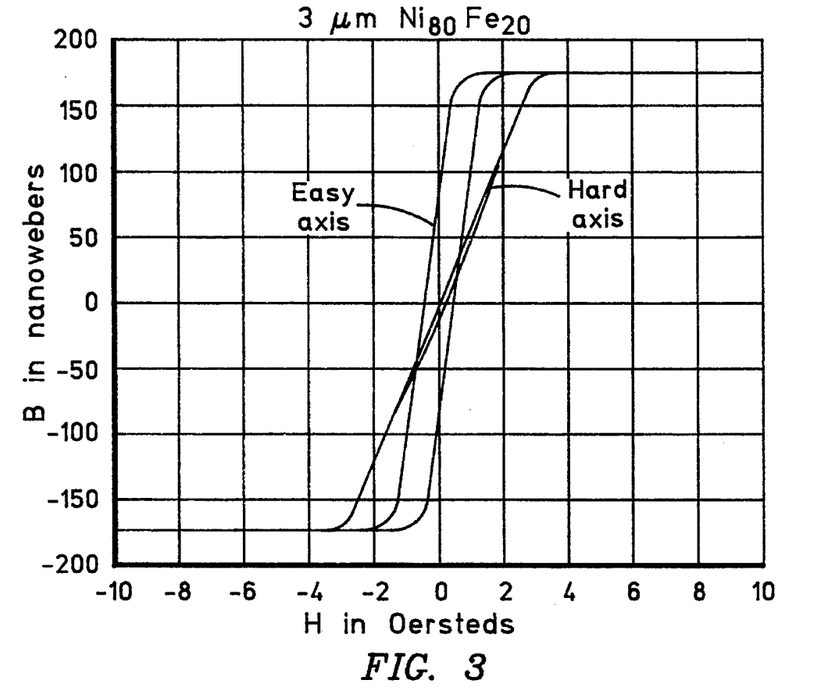
FIG. 3 is a B/H curve of a three microns thick layer of $Ni_{80}Fe_{20}$.
Figure 4:
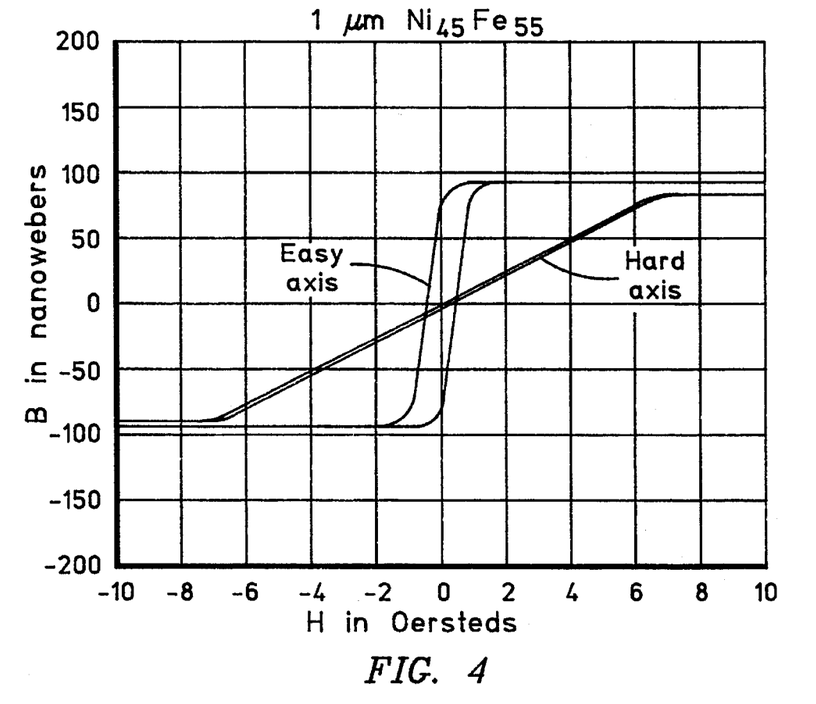
FIG. 4 is a B/H curve of a one micron thick layer of $Ni_{45}Fe_{55}$.

FIGS. 3 and 4 are graphs of the B/H curves (hysteresis loops) for particular thicknesses of the materials which can be used for the second and first layers respectively of each of the pole tips PT1 and PT2 and poles P1 and P2, respectively. Both of these layers show a B/H curve for an easy axis orientation and a hard axis orientation of the material. In FIG. 3 the B/H curves were for a three micron thick layer of $Ni_{80}Fe_{20}$. It can be seen from the easy axis that the positive and negative remanent magnetization B in the layer was approximately plus and minus 150 nanowebers respectively. Coercivity $H_c$, which is the applied field H, was approximately 0.4 Oe to bring this material back to a zero field. In FIG. 4 a one micron layer of $Ni_{45}Fe_{55}$ was tested to produce the B/H hysteresis loop along the easy axis and a hysteresis loop along the hard axis. Here the coercivity $H_c$ was approximately 0.45 Oe. The magnetization of this material along the easy axis is almost 100 nanowebers. The field B in nanowebers is directly proportional to the thickness and moment of the material. Accordingly, if the one micron layer in FIG. 4 is scaled to three microns to equate to the thickness of the layer in FIG. 3, the field B would be approximately 300 nanowebers which is almost twice as much as the field B for the material in FIG. 3. Accordingly, the $Ni_{45}Fe_{55}$ has a significantly higher field B per unit thickness than the $Ni_{80}Fe_{20}$ material in FIG. 3. As stated hereinabove, the main problem with the $Ni_{45}Fe_{55}$ material, shown in FIG. 4, is that it has an extremely high magnetostriction which causes poor reading performance. Since moment is directly proportional to the field B per unit thickness the moment of the $Ni_{45}Fe_{55}$ material is significantly higher than the moment of the $Ni_{80}Fe_{20}$ material.

We have discovered that we can overcome the problems due to magnetostriction when high moment NiFe materials are used for the first and second layers of the pole tips PT1 and PT2, as shown in FIG. 2. As stated hereinabove, the pole tip PT2 and pole P2 has a combination of high and low moment layers 40 and 42 respectively and pole tip PT1 and pole P1 has a combination of high and low moment layers 44 and 46 respectively. Each of these layers has a thickness which is deposited in a plating bath. We have discovered that by providing a particular thickness ratio of the combination of layers for each pole tip PT1 and PT2 that the magnetostriction of each combination of layers can be reduced substantially to zero. The thickness ratio is the thickness of the low moment second layer divided by the thickness of the high moment first layer. This would be the thickness of the second layer 42 divided by the thickness of the first layer 40 for the pole tip PT2 and the thickness of the second layer 46 divided by the thickness of the first layer 44 for the pole tip PT1. We have discovered that a thickness ratio of substantially seven of the combined first and second high and low moment layers results in a magnetostriction of substantially zero.

Figure 5:
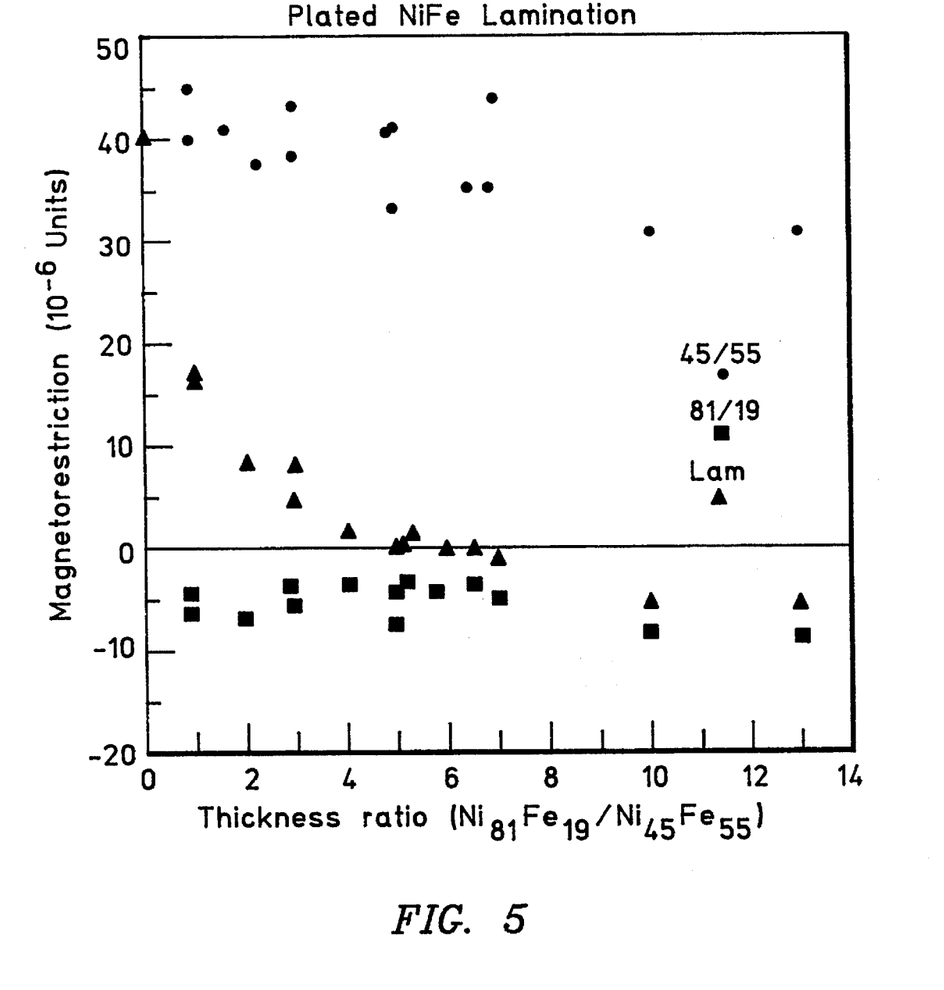
FIG. 5 is a graph illustrating magnetostriction versus thickness ratio for first and second layers and a combination of these layers.

FIG. 5 shows the results of various tests conducted to determine the magnetostriction of the high moment and low moment first and second layers individually and the magnetostriction when these materials are combined in various thickness ratios from substantially 0 to 14. The overall thickness of the layers was the same. The thickness ratio applies to the combined layers only. The round dot indicates $Ni_{45}Fe_{55}$, the square dot indicates $Ni_{81}Fe_{19}$ and the triangular dot indicates the combination of the $Ni_{45}Fe_{55}$ and $Ni_{81}Fe_{19}$ layers. It can be seen that the magnetostriction of the $Ni_{45}Fe_{55}$ material is approximately $38 \times 10^{-6}$ units and the magnetostriction of the $Ni_{81}Fe_{19}$ material was approximately $-4 \times 10^{-6}$ units. When the materials were combined in thickness ratios in a range between four to seven it can be seen that the magnetostriction was substantially zero. Since a slightly negative magnetostriction is better than a slightly positive magnetostriction an acceptable range of thickness is considered to be between four and nine, with a preferred thickness ratio being approximately seven. With a thickness ratio of seven, the magnetostriction of the combined materials is assured of not going positive.

Figure 6:
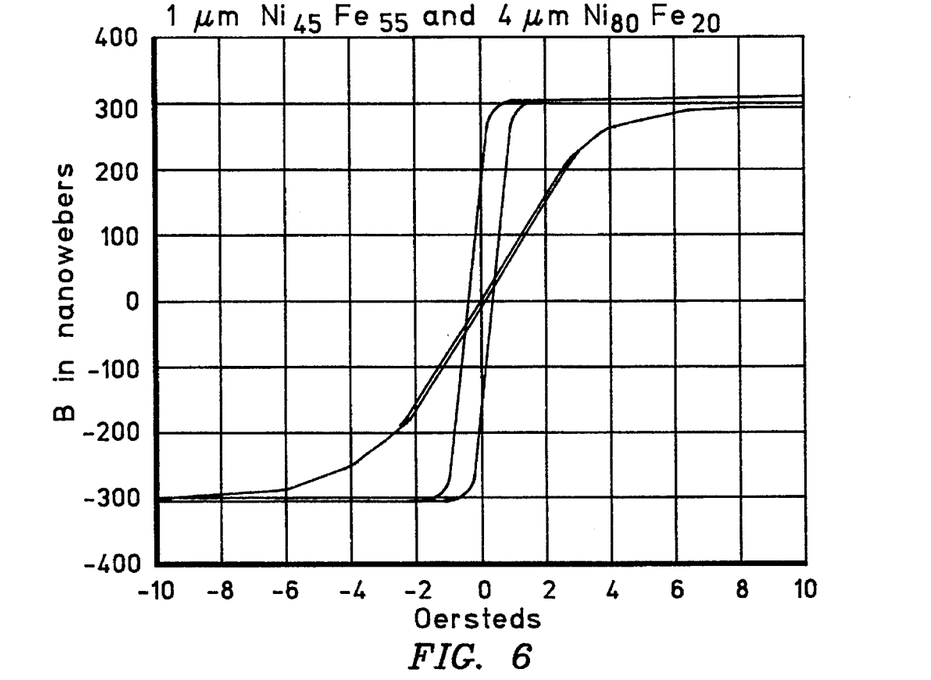
FIG. 6 is a B/H curve of a combination of a one micron thick layer of $Ni_{45}Fe_{55}$ and a four micron thick layer of $Ni_{80}Fe_{20}$.
Figure 7:
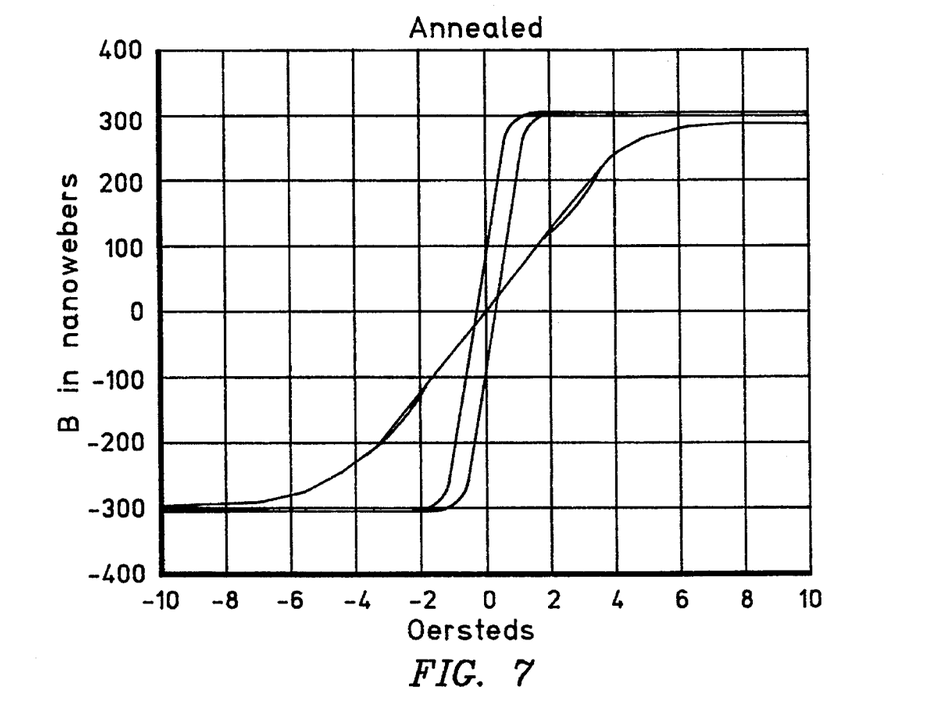
FIG. 7 is a B/H curve of the combined layers of FIG. 5 after annealing.

A B/H hysteresis loop for a combination of the first and second high moment and low moment layers is illustrated in FIG. 6. A one micron thick high moment layer of $Ni_{45}Fe_{55}$ combined with a four micron thick low moment layer of $Ni_{80}Fe_{20}$ resulted in magnetization B of approximately 300 nanowebers. It is also important to note from this curve that the individual layers did not break up into individual hysteresis loops acting on their own, but in contrast acted together to provide a single hysteresis loop. FIG. 7 is a B/H hysteresis loop for the same combination of materials shown in FIG. 6 after annealing.

Figure 8:
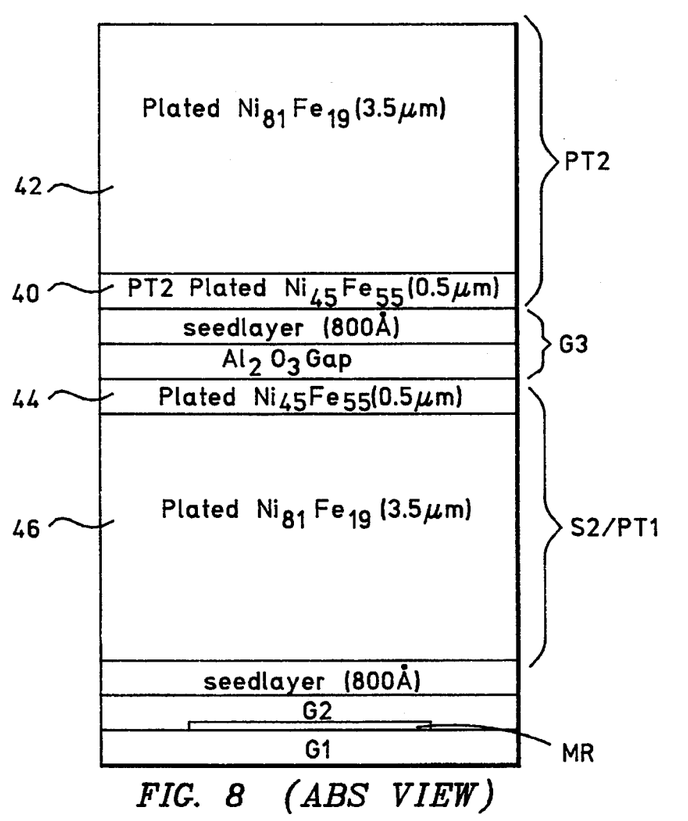
FIG. 8 is a schematic ABS illustration of an exemplary pole tip configuration for an inductive magnetic head.

An exemplary metal-in-gap configuration for the pole tips of the inductive head portion of the merged MR head illustrated in FIG. 2 is illustrated in an ABS view in FIG. 8. As shown in FIG. 8 the pole tip PT2 has a high moment first layer 40 which is substantially 0.5 microns thick and a second low moment layer 42 which is substantially 3.5 microns thick. In the same manner the pole tip PT1 has a high moment first layer 44 which is approximately 0.5 microns thick and a low moment second layer 46 which is approximately 3.5 microns thick. Accordingly, each of the pole tips PT2 and PT1 has a combination of layers with a thickness ratio of substantially seven to establish the magnetostriction of each of these combination of layers at substantially zero. As stated hereinabove, the material of the high moment layers 40 and 44 is preferably substantially $Ni_{45}Fe_{55}$ and the material of the low moment layers 42 and 46 is Permalloy which is $Ni_{81}Fe_{19}$. The thickness of a seedlayer is not figured into the thickness ratio if it is non-magnetic, such as copper. However, if the seedlayer is magnetic it should be the same material as the material of the adjacent magnetic layer. In this instance its thickness would be figured into the thickness ratio.

It is a distinct advantage that both the high moment and low moment layers are NiFe since they can be plated with similar plating baths merely by adjusting the ferrous sulphate content of the bath. It should be understood that different proportions of Ni and Fe for either or both of the first and second layers of each of the pole P1 and P2 can be different than those described above to achieve substantially zero magnetostriction. For instance, in reference to FIG. 5, if the second layer low moment material was $Ni_{90}Fe_{10}$ instead of $Ni_{81}Fe_{19}$ the magnetostriction of this substituted material would be more negative. The ratio between the high moment material with respect to the low moment material would then be lower, such as approximately three instead of approximately five. It should also be understood that other materials other than NiFe could be employed in appropriate thickness ratios to achieve substantially zero magnetostriction. Examples of these materials are NiFeX where X is selected from the group Cr, Rh, No and Co or CoFeX where X is Co, Ni and Cr.

Figure 9:
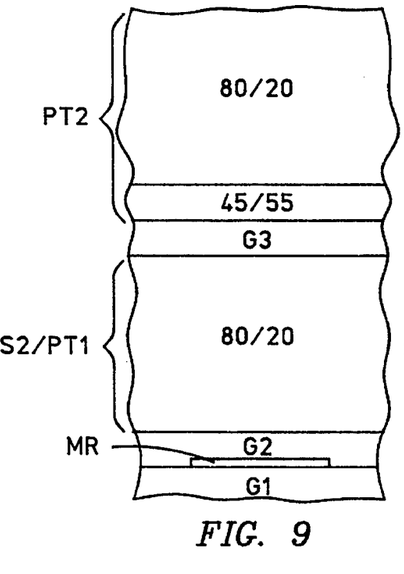
FIG. 9 is an ABS schematic illustration of a high moment merged MR head where only the second pole tip employs a MIG configuration.
Figure 10:
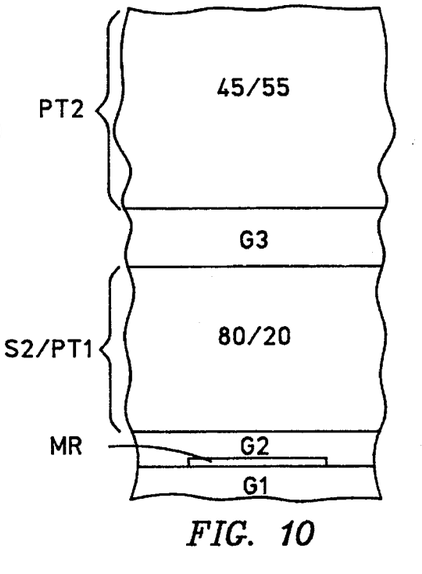
FIG. 10 is an ABS schematic illustration of a high moment merged MR head where neither pole tip employs a MIG configuration.

The merged MR head described in FIGS. 2 and 8 can have a very narrow gap G3 so that the head will have a very high linear density. If the linear density requirement is not too high so that the gap G3 can be made longer, then the first pole tip PT1 would not be required to employ the MIG configuration and can be a single layer of low moment material. This is because the second pole tip PT2 is the last pole tip to write magnetic information into the moving magnetic medium. Such an embodiment is illustrated in FIG. 9. The second pole tip PT2 may incorporate the MIG configuration, however, it is not necessary that the thickness ratio between the layers be fashioned to zero out the magnetostriction since the second shield S2/PT1 will protect the MR stripe from interference due to magnetostriction. FIG. 10 is still another embodiment of a merged MR head wherein the second pole tip PT2 is constructed entirely of the high moment material $Ni_{45}Fe_{55}$ and the first pole tip PT1 is of low moment $Ni_{80}Fe_{20}$. Even though this material will cause considerable magnetostriction, as discussed hereinabove, it will not interfere with the operation of the MR stripe since the MR stripe is protected by the second shield layer S2/PT1.

Figure 11:
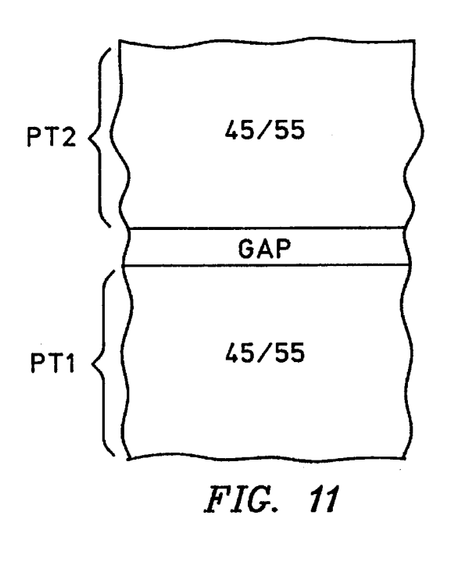
FIG. 11 is an ABS schematic illustration of a high moment inductive head only for writing only where neither pole tip employs a MIG configuration.
Figure 12:
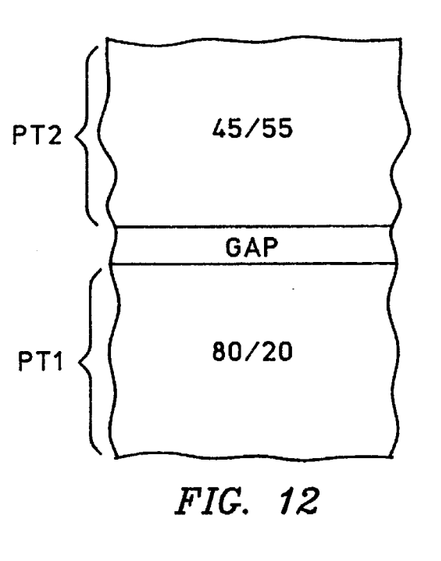
FIG. 12 is an ABS schematic illustration of a high moment inductive head only for writing only when neither pole tip has a MIG configuration.
Figure 13:
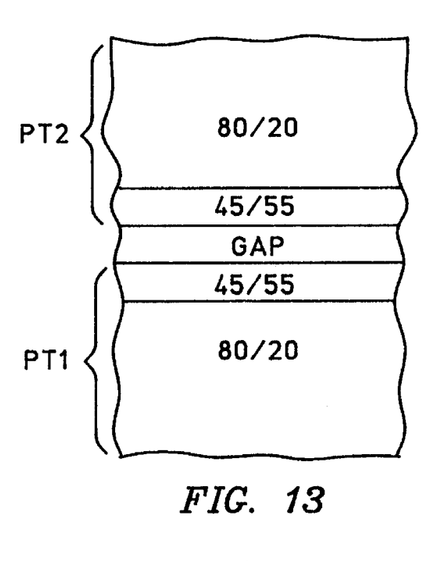
FIG. 13 is an ABS schematic illustration of a high moment inductive head only for reading and writing where both pole tips employ a MIG configuration.
Figure 14:
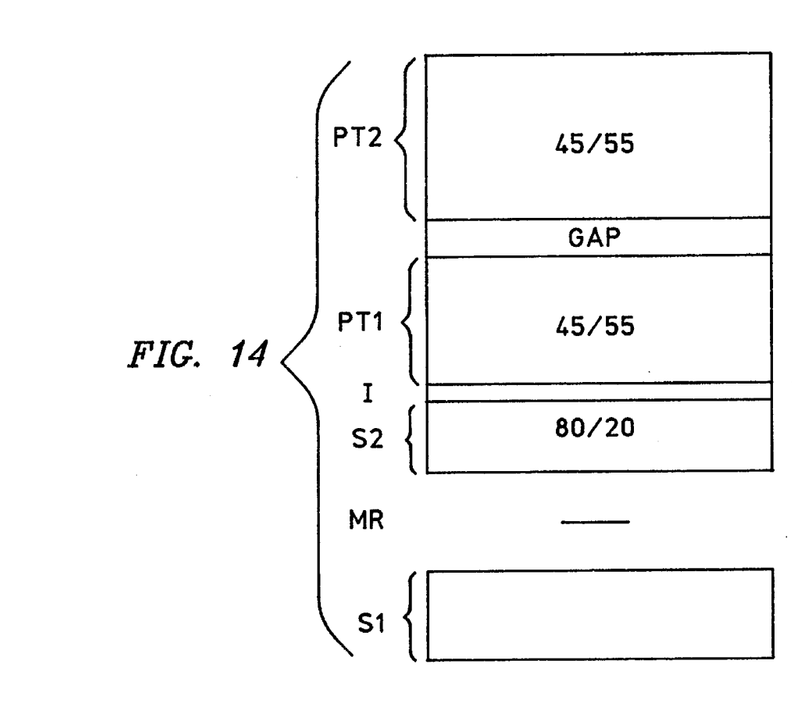
FIG. 14 is a schematic ABS illustration of a piggy-back type MR head where the MIG configuration is employed.
Figure 15:
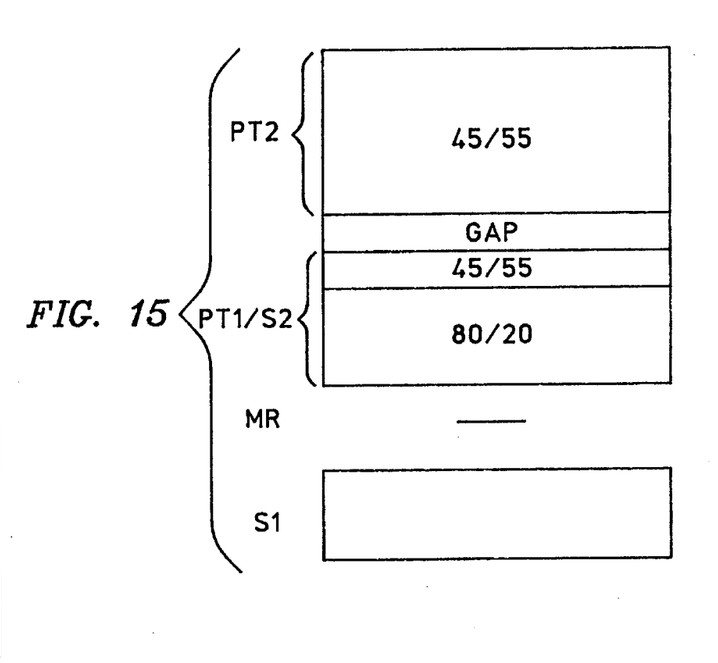
FIG. 15 is a schematic ABS illustration of a merged MR head where the MIG configuration is employed.

FIGS. 11, 12 and 13 are schematic ABS illustrations of inductive heads, FIGS. 11 and 12 being embodiments of an inductive head only for performing a write only function and the FIG. 13 embodiment being employed for performing read and write functions. In FIG. 11 the first and second pole tips PT1 and PT2 employ the high moment material $Ni_{45}Fe_{55}$. Since this embodiment performs a write function only, the magnetostriction of the material will be of no consequence. FIG. 12 is a slight variation of the FIG. 11 embodiment in that the first pole tip PT1 may be constructed of Permalloy. Since the FIG. 12 embodiment performs a write function only, the high moment of the material $Ni_{45}Fe_{55}$ of the second pole tip PT2 is of no consequence. If the inductive head only is to perform both read and write functions, then the magnetostriction should be substantially zero so that the magnetostriction does not interfere with the read function. This embodiment is shown in FIG. 13 wherein each of the pole tips PT1 and PT2 employs a MIG configuration with a thickness ratio as discussed hereinabove to establish magnetostriction at approximately zero. FIG. 14 shows a piggyback type MR head with both pole tips PT1 and PT2 adjacent the gap and made of $Ni_{45}Fe_{55}$. S2 is of Permalloy to shield the MR sensor from noise and is insulated from the pole tip PT1 by an insulation layer I. FIG. 15 shows a merged MR head where the pole tip PT2 is $Ni_{45}Fe_{55}$ and the pole tip PT1 is the MIG configuration.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A metal-in-gap thin film magnetic head comprising:

a gap layer;

first and second pole pieces which include first and second pole tips respectively, the first and second pole tips being separated by the gap layer;

the second pole piece including a combination of layers, the combination of layers including a first layer of high magnetic moment material and a second layer of low magnetic moment material, said high magnetic moment material having a higher magnetic moment than said low magnetic moment material;

the first layer being closer to the gap layer than the second layer;

one of the first and second layers having a positive magnetostriction and the other of the first and second layers having a negative magnetostriction;

the combination of layers having a thickness ratio which is a thickness of the second layer divided by a thickness of the first layer; and the thickness ratio being selected to provide the combination of layers with a magnetostriction which is less than said positive magnetostriction.

2. A metal-in-gap thin film magnetic head comprising:

a gap layer;

first and second pole pieces which include first and second pole tips respectively, the first and second pole tips being separated by the gap layer;

each of the first and second pole pieces including a combination of layers, the combination of layers including a first layer of high magnetic moment material and a second layer of low magnetic moment material, said high magnetic moment material having a higher magnetic moment than said low magnetic moment material;

the first layer being closer to the gap layer than the second layer;

one of the first and second layers having a positive magnetostriction and the other of the first and second layers having a negative magnetostriction;

the combination of layers having a thickness ratio which is a thickness of the second layer divided by a thickness of the first layer; and the thickness ratio being selected to provide the combination of layers with substantially zero magnetostriction.

3. A magnetic head as claimed in claim 2 including:

a first insulation layer on top of the first pole piece;

at least one coil layer on top of the first insulation layer;

at least a second insulation layer on top of the coil layer; and said second pole piece disposed on top of the second insulation layer.

4. A magnetic media drive including the magnetic head as claimed in claim 3, the drive comprising:

a housing;

a support mounted in the housing for supporting the magnetic head;

medium moving means mounted in the housing for moving a magnetic medium past the magnetic head in a transducing relationship therewith;

positioning means connected to the support for moving the magnetic head to multiple positions with respect to a moving magnetic medium so as to process signals with respect to multiple tracks on the magnetic medium; and control means connected to the magnetic head, the medium moving means and the positioning means for controlling and processing signals with respect to the magnetic head, controlling movement of the magnetic medium and controlling the position of the magnetic head.

5. A merged MR head including the magnetic head of claim 3, the merged MR head including:

a first shield layer;

a first gap layer on top of the first shield layer;

an MR stripe on top of the first gap layer;

a second gap layer on top of the MR stripe; and a second shield layer on top of the second gap layer, the second shield layer being the first pole piece of said magnetic head.

6. A magnetic media drive including the magnetic head as claimed in claim 5, the drive comprising:

a housing;

a support mounted in the housing for supporting the magnetic head;

medium moving means mounted in the housing for moving a magnetic medium past the magnetic head in a transducing relationship therewith;

positioning means connected to the support for moving the magnetic head to multiple positions with respect to a moving magnetic medium so as to process signals with respect to multiple tracks on the magnetic medium; and control means connected to the magnetic head, the medium moving means and the positioning means for controlling and processing signals with respect to the magnetic head, controlling movement of the magnetic medium and controlling the position of the magnetic head.

7. A magnetic head as claimed in claim 2 including: the thickness ratio being in the range of 4–9.

8. A magnetic head as claimed in claim 2 including:

the material of the first layer being NiFe and the material of the second layer being NiFe; and the ratio of Ni to Fe in the second layer being greater than the ratio of Ni to Fe in the first layer.

9. A magnetic head as claimed in claim 8 including: the thickness ratio being in the range of 4–9.

10. A magnetic head as claimed in claim 9 including:

a first insulation layer on top of the first pole piece;

at least one coil layer on top of the first insulation layer;

at least a second insulation layer on top of the coil layer; and said second pole piece disposed on top of the second insulation layer.

11. A magnetic media drive including the magnetic head as claimed in claim 10, the drive comprising:

a housing;

a support mounted in the housing for supporting the magnetic head;

medium moving means mounted in the housing for moving a magnetic medium past the magnetic head in a transducing relationship therewith;

positioning means connected to the support for moving the magnetic head to multiple positions with respect to a moving magnetic medium so as to process signals with respect to multiple tracks on the magnetic medium; and control means connected to the magnetic head, the medium moving means and the positioning means for controlling and processing signals with respect to the magnetic head, controlling movement of the magnetic medium and controlling the position of the magnetic head.

12. A merged MR head including the magnetic head of claim 10, the merged MR head including:

a first shield layer;

a first gap layer on top of the first shield layer;

an MR stripe on top of the first gap layer;

a second gap layer on top of the MR stripe; and a second shield layer on top of the second gap layer, the second shield layer being the first pole piece of said magnetic head.

13. A magnetic media drive including the magnetic head as claimed in claim 12, the drive comprising:

a housing;

a support mounted in the housing for supporting the magnetic head;

medium moving means mounted in the housing for moving a magnetic medium past the magnetic head in a transducing relationship therewith;

positioning means connected to the support for moving the magnetic head to multiple positions with respect to a moving magnetic medium so as to process signals with respect to multiple tracks on the magnetic medium; and control means connected to the magnetic head, the medium moving means and the positioning means for controlling and processing signals with respect to the magnetic head, controlling movement of the magnetic medium and controlling the position of the magnetic head.

14. A magnetic head as claimed in claim 9 including:

the material of the first layer being substantially $Ni_{45}Fe_{55}$ and the material of the second layer being substantially $Ni_{80}Fe_{20}$.

15. A magnetic head as claimed in claim 14 including:

the thickness ratio being substantially 7.

16. A thin film magnetic head as claimed in claim 15 including:

a first insulation layer on top of the first pole piece;

at least one coil layer on top of the first insulation layer;

at least a second insulation layer on top of the coil layer; and the second pole piece disposed on top of the second insulation layer.

17. A magnetic media drive including the magnetic head as claimed in claim 16, the drive comprising:

a housing;

a support mounted in the housing for supporting the magnetic head;

medium moving means mounted in the housing for moving a magnetic medium past the magnetic head in a transducing relationship therewith;

positioning means connected to the support for moving the magnetic head to multiple positions with respect to a moving magnetic medium so as to process signals with respect to multiple tracks on the magnetic medium; and control means connected to the magnetic head, the medium moving means and the positioning means for controlling and processing signals with respect to the magnetic head, controlling movement of the magnetic medium and controlling the position of the magnetic head.

18. A merged MR head including the magnetic head of claim 16, the merged MR head including:

a first shield layer;

a first gap layer on top of the first shield layer;

an MR stripe on top of the first gap layer;

a second gap layer on top of the MR stripe; and a second shield layer on top of the second gap layer, the second shield layer being the first pole piece of said magnetic head.

19. A metal-in-gap thin film magnetic head comprising:

a gap layer;

first and second pole pieces which include first and second pole tips respectively, the first and second pole tips being separated by the gap layer;

at least one of the first grid second pole tips including a combination of layers, the combination of layers including first layer of high magnetic moment material and a second layer of low magnetic moment material, said high magnetic moment material having a higher magnetic moment than said low magnetic moment material;

the first layer being closer to the gap layer than the second layer;

one of the first and second layers having a positive magnetostriction and the other of the first and second layers having a negative magnetostriction;

the combination of layers having a thickness ratio which is a thickness of the second layer divided by a thickness of the first layer; and the thickness ratio being selected to provide the combination of layers with a magnetostriction which is less than said positive magnetostriction.

20. A magnetic head as claimed in claim 19 including:
the thickness ratio being in the range of 4–9.

21. A magnetic head as claimed in claim 20 including:
the material of the first layer being substantially $Ni_{45}Fe_{55}$ and the material of the second layer being substantially $Ni_{80}Fe_{20}$.

22. A magnetic head as claimed in claim 21 including;
the thickness ratio being substantially 7.

23. A magnetic head as claimed in claim 19 including:
only the first pole tip comprising said combination of layers.

24. A magnetic head as claimed in claim 23 including:
the thickness ratio being in the range of 4–9.

25. A magnetic head as claimed in claim 24 including:
the material of the first layer being substantially $Ni_{45}Fe_{55}$ and the material of the second layer being substantially $Ni_{80}Fe_{20}$; and
said second pole tip consisting essentially of $Ni_{45}Fe_{55}$.

26. A magnetic head as claimed in claim 25 including:
the thickness ratio being substantially 7.

27. A magnetic head as claimed in claim 19 including:
each of the first and second pole tips comprising said combination of layers.

28. A magnetic head as claimed in claim 27 including:
the thickness ratio being in the range of 4–9.

29. A magnetic head as claimed in claim 28 including:
the material of the first layer being substantially $Ni_{45}Fe_{55}$ and the material of the second layer being substantially $Ni_{80}Fe_{20}$.

30. A magnetic head as claimed in claim 29 including:
the thickness ratio being substantially 7.

* * * * *

UNITED STATES PATENT AND TRADEMARK OFFICE
CERTIFICATE OF CORRECTION

PATENT NO.   : 5,606,478
DATED        : February 25, 1997
INVENTOR(S)  : Chen et al It is certified that error appears in the above-indentified patent and that said Letters Patent is hereby corrected as shown below:

Column 12, line 49, change "grid" to --and--; and
          line 51, insert --a-- between "including" and "first".

Signed and Sealed this

Twenty-fourth Day of February, 1998

Attest:

Attesting Officer

BRUCE LEHMAN

Commissioner of Patents and Trademarks